United States Patent [19]
Zahn et al.

[11] 3,927,453
[45] Dec. 23, 1975

[54] APPARATUS FOR FORMING INSULATED SPLICES

[75] Inventors: Irwin Zahn, New York; Feroz Husain, Rego Park, both of N.Y.

[73] Assignee: General Staple Company, New York, N.Y.

[22] Filed: Jan. 17, 1974

[21] Appl. No.: 434,185

Related U.S. Application Data

[63] Continuation-in-part of Ser. No. 335,417, Feb. 23, 1973, abandoned.

[52] U.S. Cl. ................... 29/203 D; 29/628; 72/332; 72/338; 72/404; 113/119
[51] Int. Cl.² ......................................... H01R 43/04
[58] Field of Search ....... 29/203 R, 203 D, 203 DT, 29/629, 628, 33 M; 113/119; 72/324, 332, 338, 404, 476

[56] References Cited
UNITED STATES PATENTS

| | | | |
|---|---|---|---|
| 3,605,261 | 9/1971 | Zahn et al. | 29/628 |
| 3,636,611 | 1/1972 | Rosenbaum | 29/203 D |
| 3,685,148 | 8/1972 | Garfinkel | 29/628 |
| 3,751,961 | 8/1973 | Graf | 72/339 |
| 3,753,279 | 8/1973 | Eppler | 29/203 D |
| 3,783,490 | 1/1974 | Garfinkel | 29/203 D |

Primary Examiner—Milton S. Mehr
Assistant Examiner—James R. Duzan
Attorney, Agent, or Firm—Lerner, David, Littenberg & Samuel

[57] ABSTRACT

A method is disclosed for making an insulated splice for joining elements, the method including the steps of providing a composite supply strip which includes a layer of non-conductive material bonded to a layer of electrically conductive material, and crimping a predetermined length of the composite supply strip about the elements until the electrically conductive material is in electrical contact with the elements and portions of the composite supply strip extend between and preferably encircle the elements. In this manner, an insulated splice is obtained which insulatingly seals off the joined elements from the atmosphere and which is impervious to moisture and other contaminants. This method may also be employed in forming closed-end splices about the ends of two elements to be joined as well as in forming a terminal about the end of a single conductor. The unique insulated splices and terminal as produced by the above methods and a new composite supply strip wherein the electrically non-conductive material is in corrugated form for use in the aforedescribed methods are also disclosed as well as novel dies for use in an automatic splice producing machine which includes means for forming such splices from a continuous supply roll.

11 Claims, 27 Drawing Figures

APPARATUS FOR FORMING INSULATED SPLICES

REFERENCE TO OTHER APPLICATIONS

This application is a Continuation-In-Part of U.S. patent application Ser. No. 335,417, filed Feb. 23, 1973, now abandoned.

FIELD OF THE INVENTION

This invention related to insulated electrical connectors, more particularly to insulated electrical connectors which may be automatically formed, driven and crimped by a machine supplied with a continuous supply roll, and even more particularly to a method for forming an insulated splice or terminal from a continuous supply roll, to the insulates splices and terminals produced thereby, to unique dies employed in automatic splice producing machines in forming such insulated splices and to composite supply strips which include a corrugated non-conductive layer, employed in forming such splices.

BACKGROUND OF THE INVENTION

In the U.S. Pat. No. 3,636,611 issued Jan. 25, 1972 to Irving W. Rosenbaum entitled "Apparatus for Splicing Wires", and assigned to the assignee of the instant invention, there is disclosed a machine for producing a connector (also known as a splice) about a pair of wires which are to be electrically and mechanically joined. As is disclosed in the aforementioned patent, the apparatus thereof operates from a continuous supply of flat electrically conductive material (i.e. wire stock) and in one completely automatic cycle feeds, forms, drives and crimps the splice thereformed about the pair of wires to be joined. To this end, the apparatus of the aforementioned patent includes: means for feeding an appropriate length from the supply coil; means for severing said appropriate length; means for bending the cut-off length into an inverted U-shaped configuration about a temporarily positioned anvil; and means for driving the now appropriately shaped length into an appropriately configured generally U-shaped crimping die in which has been previously positioned the ends of the two wires to be joined by the splice thus formed.

As noted in U.S. Pat. No. 3,636,611 the apparatus thereof represents a significant improvement over the previous technique of splicing wires together by a process which required the previous manufacture of preformed connectors (much like a supply of common, preformed staples) and the employment of a separate machine for driving said preformed staples into a crimping die about the wires to be joined.

The aforesaid apparatus has in fact materially simplified and reduced cost associated with producing a splice for mechanically and electrically joining a pair of electrical conductors. However, in many applications, it is desirable and indeed sometimes necessary that the splice established between the pair of conductors be electrically insulated and/or sealed so as to be impervious to moisture and other contaminants. Thus, it will be appreciated that in the typical utilization of the aforedescribed apparatus to join a pair of wires which include a bare portion from which the insulation has been stripped, the placement of an electrical splice about the bare portions of the wires will of course provide the desired electrical and mechanical connections but will leave the metallic splice thus formed, as well as regions of the bare portions of the two wires, exposed to the atmosphere.

In the same vein, U.S. Pat. No. 3,605,261 issued Sept. 20, 1971 to Irwin Zahn et al. entitled "Method and Apparatus for Making Terminals and for Attaching the Same to Conductors", and assigned to the assignee of the instant invention, discloses a machine for making a terminal and for attaching the terminal to a conductor. The apparatus disclosed in this patent operates from a continuous elongated strip or flat wire supply and in one automatic or semi-automatic cycle forms the terminal and clamps the terminal on the conductor. The apparatus disclosed includes means for feeding the elongated strip, means for forming the terminal from said strip including means for forming an aperture in first portions of said strip, means for severing second portions from the remainder of said strip, each severed second portion forming a blank, means for bending a portion of said blank into an approximate U-shape about an anvil, and means for driving the blank into a die and means for clamping said approximately U-shaped part of the bent blank on a conductor previously introduced into said die.

Prior to the development of the composite supply strip disclosed in parent application Ser. No. 335,417, filed Feb. 23, 1973 attempts to employ the aforementioned apparatus of U.S. Pat No. 3,636,611 or indeed any apparatus in such manner as to produce an insulated splice from a continuous supply roll had been unsuccessful.

The composite supply strip disclosed in application Ser. No. 335,417 was developed for use in the formation of insulated splices and insulated terminals by means of apparatus similar to the type disclosed in the aforementioned U.S. Pat. No. 3,636,611 and in U.S. Pat. No. 3,605,261. Such composite supply strip comprises an elongated layer of electrically non-conductive material; and an elongated layer of electrically conductive material adhered to the layer of non-conductive material. By employing such composite supply strip in a method of forming a splice similar to the method performed by the apparatus of the aforementioned Rosenbaum patent, a splice will be formed from a continuous supply roll that will not only mechanically and electrically join the stripped away bare portions of the pair of wires to be joined, but will also insulatingly provide a seal extending from the insulated portion of one of the wires to the insulated portion of the other wire.

Figure 1:
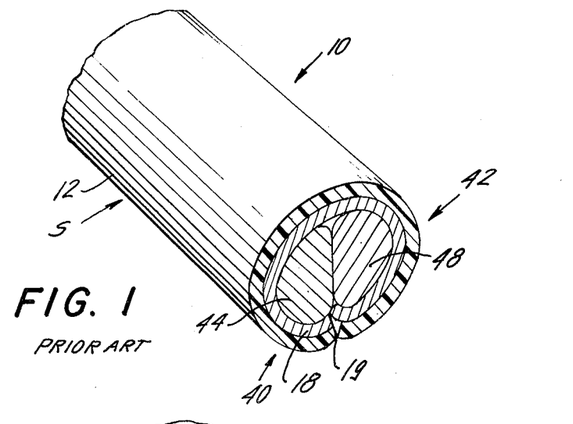
FIG. 1 is a perspective sectional view of an insulated splice constructed in accordance with the teachings of application Ser. No. 335,417.

An example of the type of insulated splice produced employing the composite supply strip and technique disclosed in application Ser. No. 335,417 is shown in FIG. 1 of the present drawings, which will be discussed in detail hereinafter. The insulated splice and technique and apparatus, including crimping dies, employed in forming such insulated splices have been well received in the trade. However, it has been found that the design of the crimping die employed in forming the insulated spice, as well as the configuration of the electrically non-conductive layer of the starting composite supply strip are instrumental in forming an insulated splice having outstanding resistance to the surrounding atmosphere as well as excellent electrical insulating properties.

In fact, where a composite supply strip has been employed comprised of a layer of a non-conductive material bonded to a layer of conductive material and prior art crimping dies such as disclosed in the aforementioned Rosenbaum patent (a schematic illustration of which is set out in FIG. 2 of the attached drawings which will be discussed in detail hereinafter), at times, the insulated splice produced may not be totally insulated. It is believed that during the crimping operation, the ends of the insulating or non-conductive layer contact the crimping die and may be peeled off or otherwise be separated from the conductive layer. Accordingly, the resulting splice produced may have bare or exposed portions of conductive material. Furthermore, when leg portions of the supply strip are bent about the elements the ends of the non-conductive layer will recede from the ends of the conductive layer thereby leaving end portions of the conductive layer exposed. In addition, the mating ends of the leg portions of the supply strip may not come into firm contact with or abut each other thereby leaving pin holes which may destroy the insulating qualities of the resulting splice. However, the present invention overcomes these problems by employing a crimping die of unique design and optionally a composite supply strip which includes a corrugated layer of electrically non-conductive material adhered to a layer of conductive material.

SUMMARY OF THE INVENTION

In accordance with the present invention, an insulated splice is provided which may be formed by employing a composite supply strip comprised of an elongated layer of electrically non-conductive material and an elongated layer of electrically conductive material adhered to the layer of non-conductive material. Such composite supply strip is employed in a method of forming an insulated splice, in many respects similar to the method performed by the apparatus of the aforementioned Rosenbaum patent. The splice formed comprises at least a pair of elements to be joined in electrical contact with one another, and an insulated connector member formed from the aforedescribed composite supply strip, and having a crown portion and a pair of leg portions joined thereto, which insulated connector member is crimped about the elements with the electrically conductive material in electrical contact with the elements and with portions of the insulated connector member extending between the elements. In a preferred embodiment of the insulated splice of the invention, leg portions of the connector member are at least partially looped about the elements to encircle such elements. In this manner, the resulting splice will not only mechanically and electrically join stripped away bare portions of the elements to be joined, but will also provide an insulating seal which closes off the elements to be joined as well as the conductive layer of the connector member from the surrounding atmosphere.

In another embodiment of the invention an insulated terminal and method for forming the same are provided which employ a composite supply strip as described above.

In a preferred embodiment of the present invention, the composite supply strip employed in forming the insulated splice or terminal will comprise a corrugated layer of electrically non-conductive material adhered to a layer of electrically conductive material. The corrugations in the non-conductive layer will allow such layer to expand and conform to and remain adhered to the layer of conductive material as such layer of conductive material is bent into an inverted U-shape and crimped during the formation of the insulated splice of the invention, as will be seen in detail hereinafter.

In another aspect of the present invention, a new crimping die of unique design is provided, which is especially useful in automatic splice producing machines used in forming the insulated splices of the invention.

As a further feature of the present invention, the insulated splice may take the form of a closed-end splice and be employed to close off the ends of two elements, such as two wires, to be joined. The closed-end splice will be an insulated splice formed by employing a composite supply strip similar to that described above. In a preferred embodiment of the closed-end insulated splice of the invention, one end of such splice will be flattened about the ends of the elements to be joined to substantially close off and insulate the ends of such elements.

In yet a further embodiment of the present invention, crimping dies are provided which may be employed in automatic splice producing machines for use in forming tapered embodiments of the closed-end splice discussed above.

It will be appreciated that all of the insulated splices and terminals of the invention whether of the closed-end type or other type may be formed from a continuous supply roll of a composite strip which includes an elongated layer of electrically non-conductive material bonded to an elongated layer of electrically conductive material. The composite supply strip or material may take the form of any of the composite supply strips and may be comprised of any of the materials and may be formed by any of the techniques disclosed in parent application Ser. No. 335,417, the disclosure of which is incorporated herein by reference thereto.

DESCRIPTION OF THE PREFERRED EMBODIMENTS

Turning to the Figures wherein like parts are represented by like numerals in the several views, there is shown in FIG. 1 a perspective sectional view of an insulated splice formed by use of the apparatus disclosed in U.S. Pat. No. 3,636,611 to Rosenbaum, the contents of which are incorporated herein by specific reference thereto. As seen in FIG. 1 (which corresponds to FIG. 6 of parent application Ser. No. 355,417, the contents of which are also incorporated herein by specific reference thereto) the insulated splice S includes a pair of wires 40, 42 to be joined which include bare, stripped away conductive portions 44 and 48, respectively. The wires 40 and 42 are joined together by means of connector member indicated generally by the numeral 10 which includes an outer layer 12 of electrically non-conductive material bonded to an inner layer 18 of electrically conductive material, electrically conductive layer 18 being in electrical contact with the conductive portions 44 and 48 of the wires 40 and 42, respectively.

Figure 2:
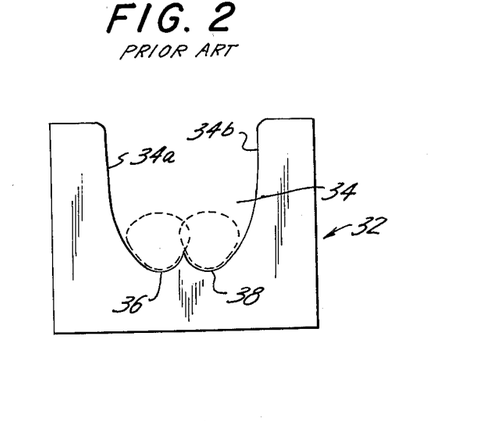
FIG. 2 is a view of a crimping die employed in forming the splice shown in FIG. 1.

Although the insulated splice shown in FIG. 1 has enjoyed success, it has been found that the ends of the layer of non-conductive material (12) when subjected to wear or stress may be peeled from the underlying layer of conductive material 18 and/or in the formation of the splice the ends of the connector may not sufficiently engage or abut one another at the juncture 19 to provide the desired degree of insulation. In forming the splice of FIG. 1, a crimping die is employed such as shown in FIG. 2 hereof and is represented generally by the numeral 32. The crimping die 32 includes a generally U-shaped receptacle 34 having a pair of concavely arcuate depressions 36 and 38 which are adapted to receive the wires 40 and 42 which are to be joined by the splices formed in the method of parent application Ser. No. 335,417. As indicated in the above-mentioned parent application and in referring to FIG. 3 of said parent application, it is indicated that a ram 30 descends driving a length L of composite supply strip into the receptacle 34 of the crimping die 32. The side edges of the generally U-shaped segment of the composite supply strip will be driven under, up and around the bare conductors 44 and 48 so as to define the ultimate splice S.

Figure 3:
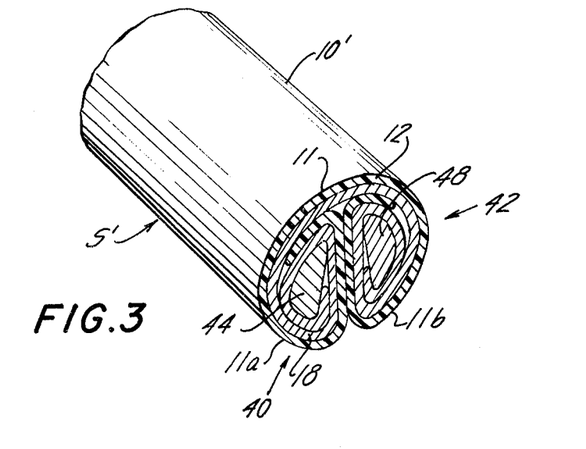
FIG. 3 is a perspective sectional view of an insulated splice constructed in accordance with the present invention in situ about a pair of conductors joined thereby.

An insulated splice $S^1$ in accordance with the present invention, is shown in FIG. 3. The insulated splice $S^1$ includes wires 40 and 42, the conductive portions 44 and 48, respectively, of which are electrically joined together by means of an insulated connector indicated generally by the numeral $10^1$. The connector $10^1$ includes an upper or crown portion 11 and first and second leg portions 11a 11b, respectively, all of which are comprised of an outer non-conductive layer 12 bonded to an inner conductive layer 18, the conductive layer 18 being in electrical contact with the bare portions 44 and 48 of the wires 40 and 42, respectively. However, it should be particularly noted that the insulated connector $10^1$ is crimped about the wires 40 and 42 in a manner such that the leg portions 11a and 11b extend between the conductive portions 44 and 48, respectively, and enclose or encircle such conductive portions. In this manner, the conductive portions 44, 48 and conductive layer 18 are well insulated from the surrounding environment.

Figures 5, 6:
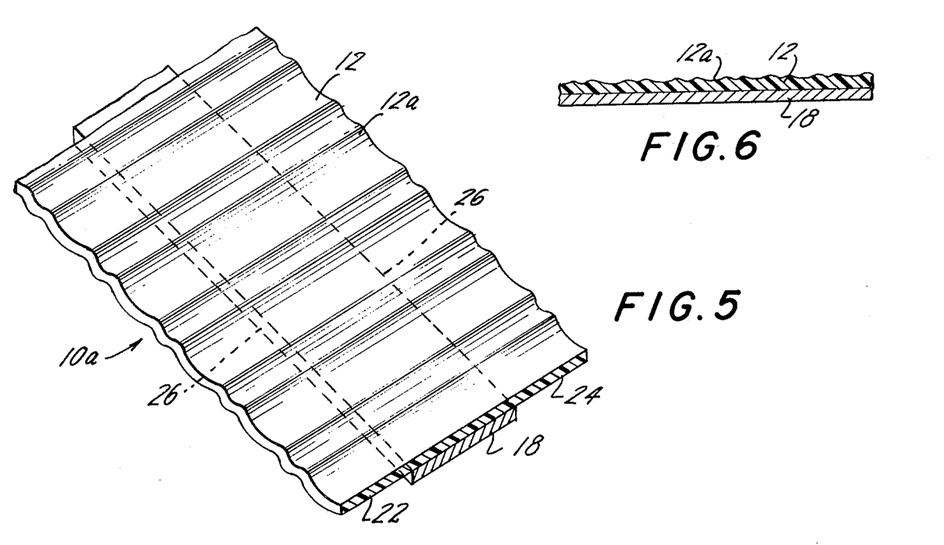
FIG. 5 is a perspective view of a portion of a composite supply strip constructed in accordance with the present invention.
FIG. 6 is a side view of the composite supply strip shown in FIG. 5.

It will be noted that in the splice of FIG. 3, the ends of the insulation or non-conductive layer 12 do not quite extend to the ends of the conductive layer 18 (this aspect of FIG. 3 being exaggerated for purposes of illustration). This can be compensated for in accordance with a further feature of the invention by employing a non-conductive layer in corrugated form as shown in FIG. 5 which corrugated layer 12 will expand during the crimping operation so that the ends of the layers 12 and 18 will match up. The corrugated layer 12 may be formed by passing the non-conductive layer through the nip of a pair of meshing gears or equivalent structure before being bonded to the conductive layer.

Figure 4:
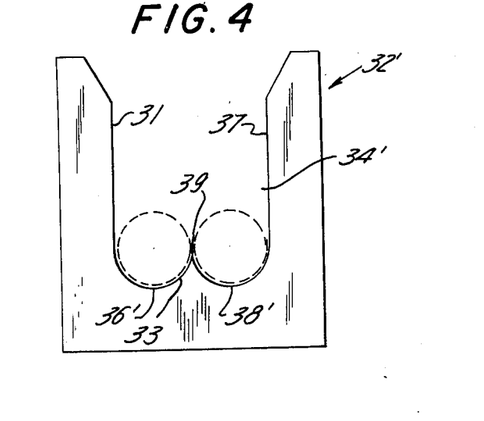
FIG. 4 is a view of the crimping die in accordance with the invention employed in forming the insulated splice shown in FIG. 3.

The improved insulated splice of the invention, as shown in FIG. 3 is formed employing the crimping die illustrated in FIG. 4 which may be employed in conjunction with the splicing machine disclosed in the aforementioned Rosenbaum patent and the aforementioned parent application Ser. No. 355,417. The unique crimping die of the invention shown in FIG. 4 is indicated generally by the numeral $32^1$. The die $32^1$ includes a generally U-shaped receptacle 34$^1$ defined by a bottom wall 33 and a pair of side walls 31 and 37. An elongated ridge 39 is disposed in the bottom wall 33 such that the ridge 39 and the bottom wall 33 together with the side walls 31 and 37 define a pair of concavely arcuate circular segments 36$^1$ and 38$^1$ such as a pair of semi-circles or other circular segments. In accordance with this aspect of the invention, the segments 36$^1$ and 38$^1$ are so oriented that if they are extended to form imaginary circles as shown by the broken lines in FIG. 4, the resulting circles would be disposed tangentially with respect to one another. In this manner, the structure of the die shown in FIG. 4 differs from the die shown in FIG. 2, wherein similar circles, as indicated by the broken lines, would overlap.

As can be appreciated from FIG. 3, the tangentially disposed circular segments 36$^1$ and 38$^1$ of the die of FIG. 4 causes the leg portions of the supply strip to be driven under the elements to be joined, up and around guided by the configuration of such circular segments 36$^1$ and 38$^1$ through the space between such elements and then looped about themsleves and such elements until a splice configuration as shown in FIG. 3 is formed. On the other hand, where a crimping die such as shown in FIG. 2 is employed, when the inverted U-shaped length of composite supply strip is driven into the receptacle 34 and into the depressions 36 and 38, the legs of such composite supply strip are driven under and up until the leg portions thereof abut one another at the juncture 19 of FIG. 1.

Turning to FIGS. 3 and 7 through 10, there is illustrated the manner in which an insulated splice is formed from the composite supply strip 10a of FIG. 5 in a method similar to the method performed by the apparatus disclosed in the aforementioned U.S. Pat. No. 3,636,611 which has been incorporated herein by specific reference thereto. In fact, to facilitate description, some of the references numerals, namely 28, 29, 30, 35 and 55 employed herein were similarly employed in the aforementioned U.S. Patent to designate corresponding elements.

Thus, by feeding means of the type disclosed in the aforementioned U.S. Patent, one end of the continuous supply strip 10a is advanced into a channelway 27 so as to come to rest above a temporarily positioned anvil 35 positioned beneath bending bars 28 and 29 (which travel together) and a narrow elongated driving ram 20 which travels in a path of movement between the bending bars 28 and 29. As seen in FIGS. 7 to 9 and 9A, the bottom 30a of the ram 30 is fashioned with a concavely arcuate surface 200, the corners 200a of which are of a different radius than the arcuate surface 200b. Thus, as will be seen hereinafter, when the ram 30 drives the length of supply strip into the die 32$^1$, the ram will drive the strip into the die without disrupting the non-conductive layer thereof which remains in contact with the conductive layer.

As explained in greater detail in the aforementioned U.S. patent, the sequence of operation is such that the bending bars 28, 29 first travel downwardly to sever (by means of shearing edges 55, 55$^1$) a predetermined length L of the composite supply strip 10a from the remaining supply thereof. Thereafter, continued downward movement of the bending bars 28, 29 will bend the length L about the anvil 35 to form the predesired inverted U-shape illustrated in FIG. 8 of the drawings hereof. It is important to appreciate and especially from a consideration of FIG. 7 with FIG. 8, that after severing the length L, the longitudinally extending edge portions 22 and 24 of the non-conductive layer 12 still extend from opposite sides of the conductive layer 18.

Figure 10:
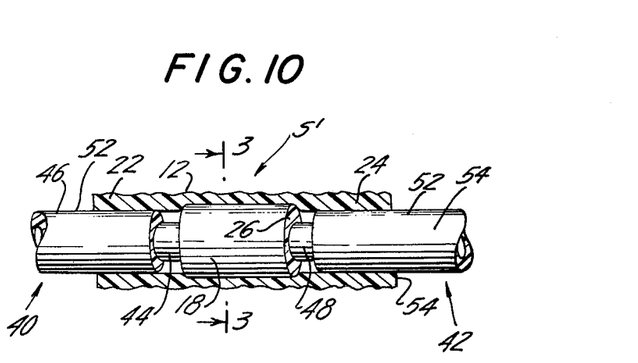
FIG. 10 is a sectional view of an insulated splice constructed in accordance with the present invention in situ about a pair of conductors joined thereby.

Continuing, and considering FIGS. 10 and 3, once the bending bars 28 and 29 have bent the length L into the appropriate shape, the driving ram 30 descends between the bars 28 and 29 and drives the length L into the crimping die 32$^1$ in accordance with the instant invention. It will be appreciated, and as is described in the aforementioned U.S. patent that as the ram descends, the anvil 35 is pivoted out of the path of travel of the length L of composite supply strip 10a which has been severed and bent in the aforedescribed manner.

Figure 9:
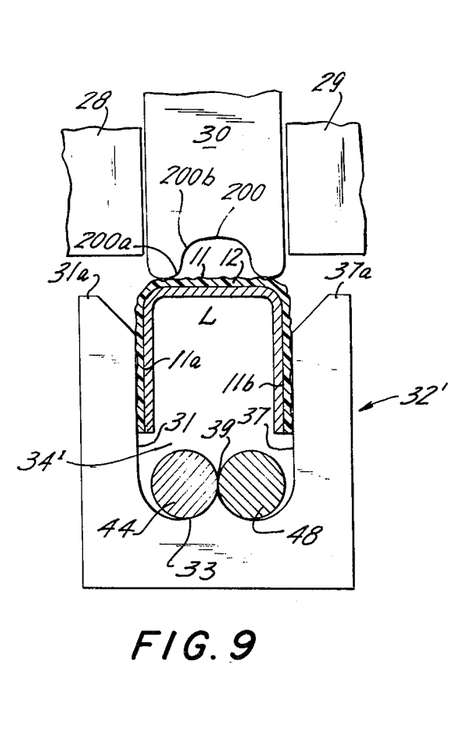
FIG. 9 illustrates in schematic form, the manner in which the appropriately shaped length of supply strip is driven into a crimping die similar to the type disclosed in U.S. Pat. No. 3,636,611 but constructed in accordance with the present invention.

A detailed description of the crimping die 32$^1$ has been set out above. However, it should be noted that the length of the sides 31 and 37 of the crimping die 32$^1$ should be such as to provide a depth from the top of the sides, that is, from 31a and 27a to the bottom wall 33 which is greater than the length of the legs 11a and 11b connected to the crown portion 11 of the length of composite supply strip 10a as shown in FIG. 9. In such case, the legs 11a and 11b of the composite supply strip 11 can be driven downwardly by the ram 30 into the receptacle 34$^1$, without buckling, around and through the space between bare conductors 44 and 48 so that end portions of the legs 11a and 11b extend above and loop around themselves and around the conductors 44 and 48 as shown in the splice of FIG. 3.

Figure 10A:
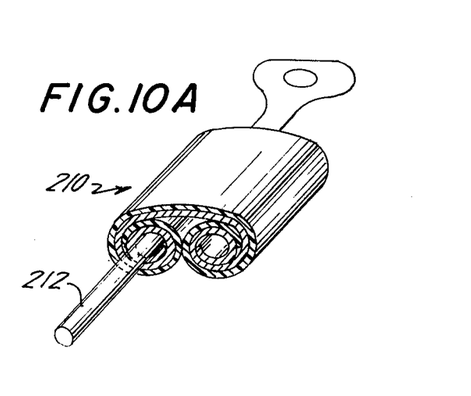
FIG. 10A is a view of an insulated terminal in accordance with the invention.

Furthermore, the crimping die 32$^1$ as shown in FIG. 9 as well as in FIG. 4 includes flared top portions 31a and 37a for guiding the entry of the legs into the die. FIG. 10A illustrates the connector shown in FIGS. 3 and 10 employed as a terminal 210 to close off and insulate one end of a conductive element such as wire 212. The technique and apparatus employed for forming the terminal 210 is described above and in U.S. Pat. No. 3,605,261, the subject matter of which is incorporated herein by specific reference thereto.

Figures 11, 12:
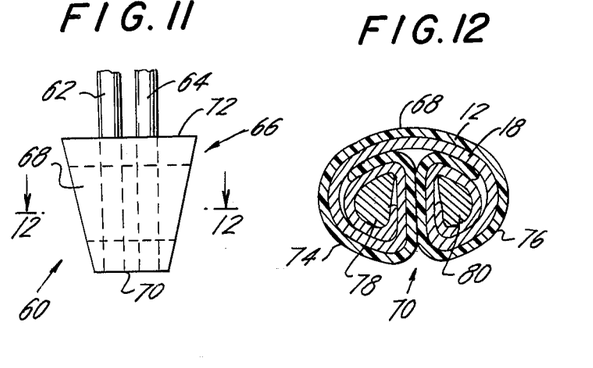
FIG. 11 is a view of an insulated closed-end splice formed about a pair of conductors joined thereby, in accordance with the present invention.
FIG. 12 is a sectional view of the closed-end splice shown in FIG. 11, taken along the lines 12—12.
Figure 13:
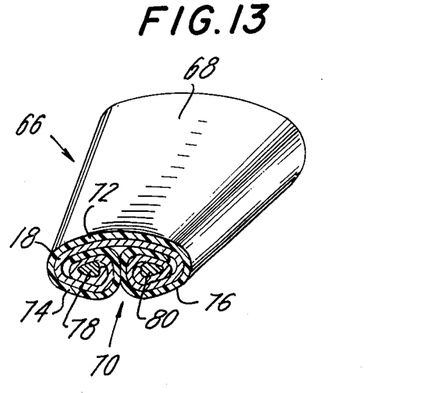
FIG. 13 is a perspective view of a portion of the closed-end splice shown in FIG. 11 showing the structure of the narrow-end portion of the splice.

Referring now to FIGS. 11 to 13, a closed end insulated splice in accordance with the present invention is shown and is identified generally by the numeral 60. As seen in FIG. 11, the closed end insulated splice comprises a pair of elements such as a pair of wires, 62 and 64, which are joined in electrical contact with one another, by means of a connector member indicated generally by the numeral 66. The connector member includes a tapered crowned portion 68 having a narrow end 70 and a wide end 72, and a pair of legs, 74 and 76 which are more readily seen in FIGS. 12, 13, 14A and 15. The connector member 66 is crimped about the ends of the wires, 62 and 64, which ends have been stripped of insulation to bare conductive cores, 78 and 80, as shown in FIGS. 12 and 13. The connector member, including the crown portion and leg portions are comprised of a layer of electrically non-conductive material 12, and a layer of conductive material 18, which is adhered to the layer of non-conductive material 12. As shown, the conductive layer 12 is in electrical contact with the conductor cores 78 and 80 of the wires 62, 64, respectively. As seen in FIG. 13 which is a perspective view of the narrow end of the connector member 66, the narrow end 70 is crimped about the conductive cores 78 and 80 so as to effectively substantially close-off such narrow ends and thus ends of the conductive cores 78 and 80.

As in the case of the insulated splice disclosed hereinbefore, and as seen in FIGS. 12 and 13, it is preferred that the connector member be crimped about the conductive cores 78 and 80 in a manner such that the legs 74 and 76 of the connector member extend between the cores 78 and 80, looping about said cores and themselves so as to substantially close off the conductive cores 78 and 80, as well as the conductive layer 18 and insulate the same from the surrounding atmosphere (i.e. the die 32a to be described hereinafter will include a pair of circular segments whose imaginary extensions form a pair of tangentially disposed circles). However, it will be appreciated that the connector member, when crimped about the ends of the wires 62 and 64, may have a cross-sectional configuration similar to that of the insulated splices of parent application Ser. No. 335,417, as shown in FIG. 1 (i.e. overlapping circles). Also it will be appreciated that the closed end splice of this aspect of the invention need not be an insulated splice (i.e. not include any insulation or nonconductive layer).

Figure 14:
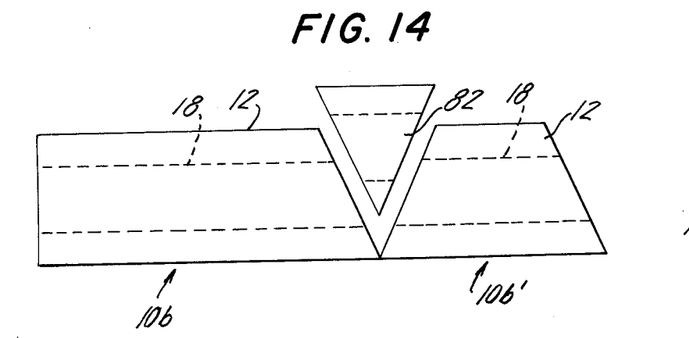
FIG. 14 illustrates a portion of a continuous supply strip, a V-section of which has been removed, which is employed in forming the closed-end splice shown in FIG. 11.
Figure 14A:
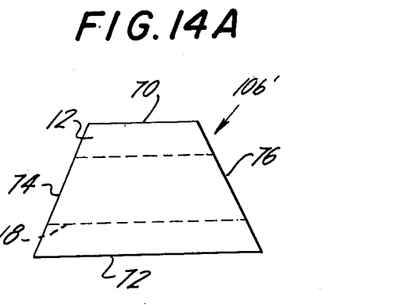
FIG. 14A illustrates a single length of composite supply strip which has been severed from the continuous roll shown in FIG. 14 and is employed in forming the splice shown in FIG. 11.
Figure 15:
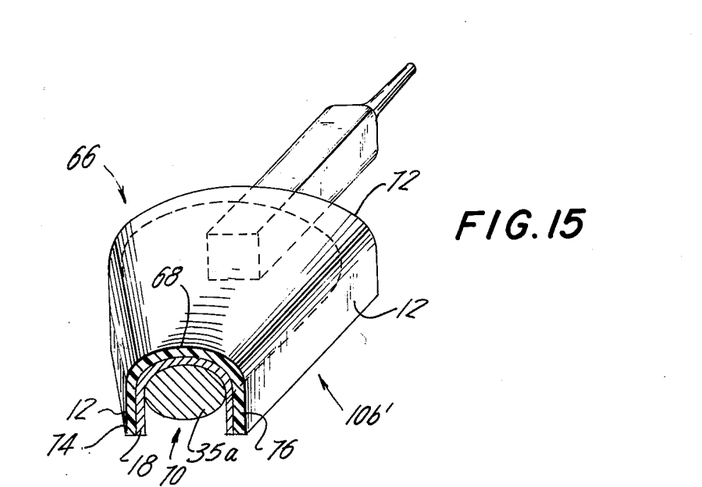
FIG. 15 illustrates in schematic form, a severed length of the supply strip bent into the desired inverted U-shape, which supply strip is employed in forming the splice shown in FIG. 11, employing apparatus of the type disclosed in U.S. Pat. No. 3,636,611.

Turning now to FIGS. 14, 14A and 15, there is illustrated the manner in which an insulated closed-end splice is formed from a composite supply strip 10b shown in FIG. 14 in a method similar to the method performed by the apparatus disclosed in the aforementioned U.S. Pat. No. 3,636,611, and parent application Ser. No. 335,417, as described hereinbefore.

Prior to advancing the continuous supply strip 10b into the channelway 27 (shown in FIG. 7), a wedge or triangular section 82 is removed from the continuous supply strip 10b. This step may be performed by apparatus similar to that shown in FIG. 7 which may be additionally provided with a wedge or triangular shaped die for effecting cutting and removal of the wedge 82 at a cutting station in advance of its forming and driving station. Alternatively, the wedge 82 may be removed by any conventional die means disposed externally to the apparatus shown in FIG. 7. The section $10b^1$ of the strip comes to rest above the temporarily positioned anvil 35a positioned beneath bending bars 28 and 29. The anvil 35a will preferably be of trapezoidal configuration as shown in FIG. 15 by the broken lines there-illustrated. The bending bars 28 and 29 will travel downwardly to sever a predetermined length $10b^1$ of the composite supply strip 10b from the remaining supply thereof. Thereafter, continued downward movement of the bending bars 28 and 29 will bend the length $10b^1$ about the anvil 35a to form the predesired inverted U-shape having a narrow end and a wide end as shown in FIG. 15. Referring not to FIG. 9, once the bending bars 28 and 29 have bent the length $10b^1$ into the appropriate shape, the driving ram 30 descends between the bars 28 and 29 and drives the length $10b^1$ into a crimping die 32a.

Figure 16:
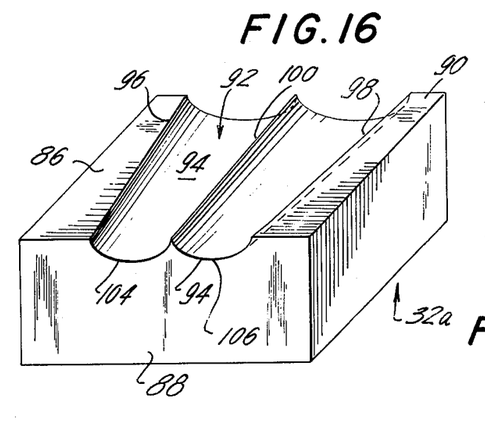
FIG. 16 is a perspective view of an improved crimping die constructed in accordance with the teachings of the present invention employed in forming a closed-end splice.

The crimping die 32a is shown in FIG. 16. Crimping die 32a includes a body portion 86 having a first end 88 and a second end 90 and a generally U-shaped receptacle 92 defined by bottom wall 94, and side walls 96 and 98. An elongated ridge 100 is disposed in the bottom wall 94 in a manner such that the ridge 100, bottom wall 94 and side walls 96 and 98 define a pair of concavely arcuate segments 104 and 106 extending from the first end 88 to the second end 90. In the die 32a, the side walls taper outwardly with respect to each other and flare away from the ridge 100, as shown, to conform to the tapered crown of the connector.

The driving ram 30 in this case will have a bottom portion which is of trapezoidal configuration so as to conform to the configuration of the crown portion 72 of the connector member 66.

It will be appreciated that as the ram 30 descends, driving the length $10b^1$ into receptacle 34 of the crimping die 32a; the sides of the generally U-shaped segment will be driven under, up, and around the bare conductors 78 and 80 so as to form the ultimate closed-end splice described above and generally shown in FIGS. 11 and 18.

Figures 17, 18, 20:
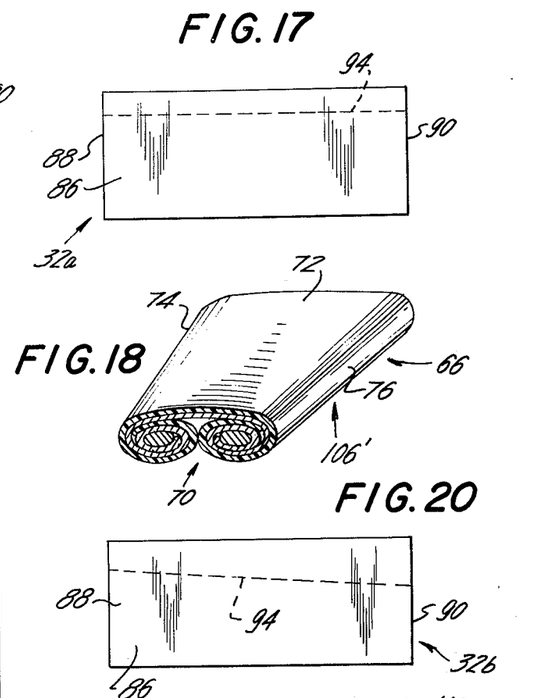
FIG. 17 is a side view of the die shown in FIG. 16.
FIG. 18 is a perspective view of a closed-end splice formed employing the die shown in FIG. 16.
FIG. 20 is a side view of the die shown in FIG. 19.
Figure 19:
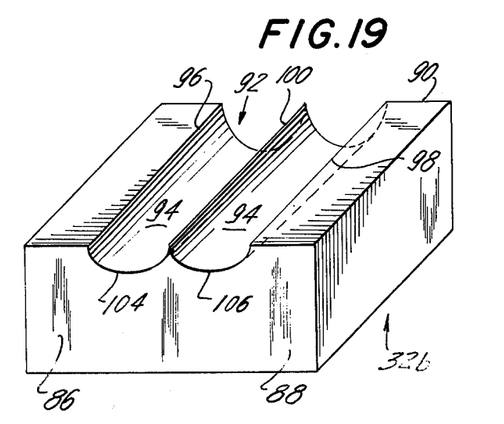
FIG. 19 is a perspective view of another embodiment of a crimping die constructed in accordance with the teachings of the present invention.
Figure 21:
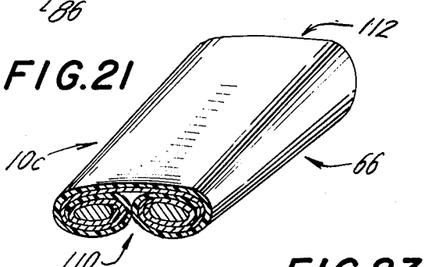
FIG. 21 is a perspective view of a closed-end splice formed employing the die shown in FIG. 19.

Referring now to FIGS. 19, 20 and 21, a crimping die 32b is shown in FIGS. 19 and 20, which die may be employed in forming a closed-end splice which is flattened at one end but does not include the tapered crown. As seen in FIG. 19, the crimping die 32b includes a body portion 86, a first end 88 and a second end 90. In addition, the die 32b includes a generally U-shaped receptacle 92 which is defined by bottom wall 94 and side walls 96 and 98. An elongated ridge 100 is disposed in the bottom wall 94 in a manner such that the ridge 100, bottom wall 94 and side walls 96 and 98 define a pair of concavely arcuate segments 104 and 106 which extend from the first end 88 to the second end 90. The pair of concavely arcuate segments 104 and 106 vary in depth from the first end 88 to the second end 90 as shown in FIGS. 19 and 20. In the embodiment of FIG. 19, the side walls 96 and 98 of the crimping die 32b will extend parallel to one another as such side walls extend from the front end or first end 88 back to the back end or second end 90.

Figures 7, 8, 9A:
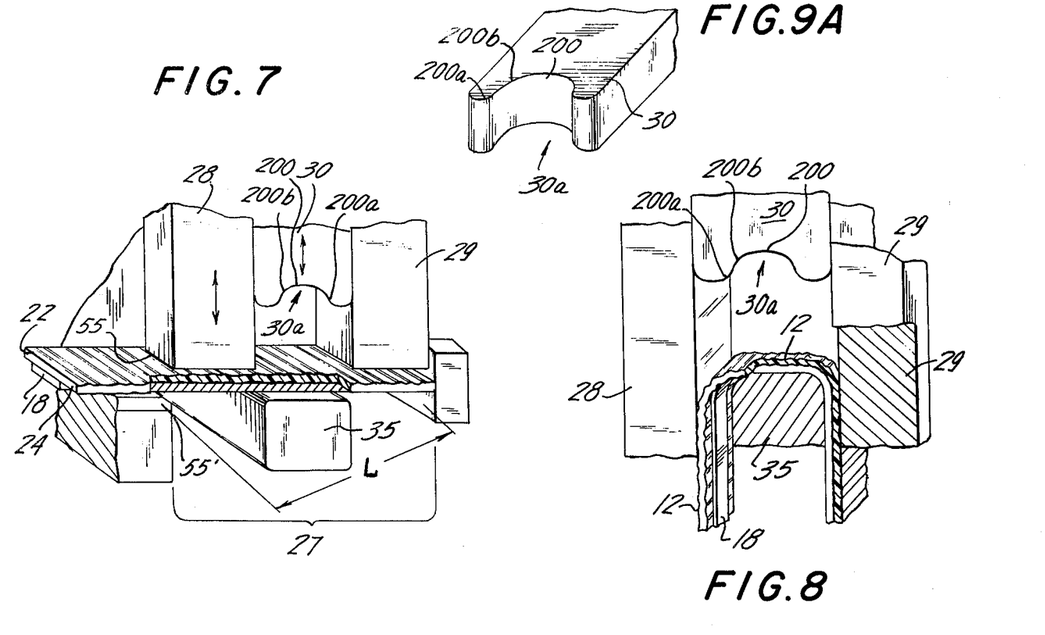
FIG. 7 is a perspective view, partly in section, illustrating the manner in which a length of composite strip of FIG. 5 is severed from the remaining portion thereof with the type of apparatus disclosed in U.S. Pat. No. 3,636,611.
FIG. 8 schematically illustrates the manner in which a severed length of the composite supply strip is bent into the desired inverted U-shape with apparatus similar to the type disclosed in U.S. Pat. No. 3,636,611.
FIG. 9A is a perspective view of a ram of the invention employed in conjunction with the apparatus shown in FIGS. 7 to 9.

The closed-end splice formed employing the crimping die 32b and the procedure set out hereinbefore employing apparatus similar to that shown in FIGS. 7, 8 and 9 will have the configuration as shown in FIG. 21 identified generally by the numeral 10c. Because of the configuration of the crimping die 32b, the closed-end splice 10c will have a flattened end 110 which is crimped about and substantially closes off the ends of the bare conductors or conductive cores 78 and 80. The closed-end splice 10c will vary in depth from the flattened end 110 to the second end 112 of the connector member 66, with the entire connector member being crimped about the conductive cores to be joined in electrical contact with one another.

It will be apparent that where the crimping die 32b of FIG. 19 is employed, the crown portion of the connecting member 66 will be substantially square or rectangular in shape and not trapezoidal in shape as is the case with respect to the connector member 66 shown in FIG. 11 as well as the splice and connector member shown in FIG. 18. Furthermore, the anvil and ram employed in forming the closed-end splice 10c may be similar to that shown in FIGS. 7, 8 and 9.

As in the case of the die 32a, the die 32b may or may not include arcuate segments whose imaginary circuit extensions are disposed tangentially with respect to each other. In like manner, the supply strip employed in connection therewith may or may not include insulation, corrugated or otherwise.

Figure 22:
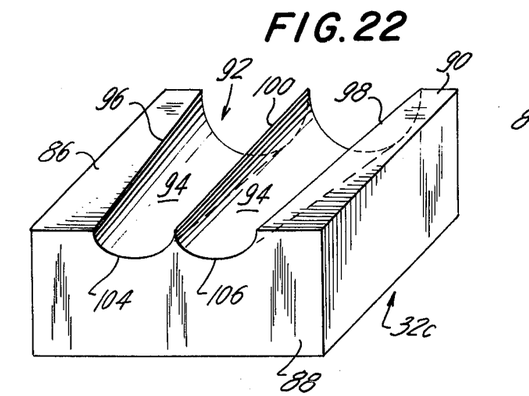
FIG. 22 is a perspective view of still another embodiment of an improved crimping die constructed in accordance with the teachings of the present invention.
Figures 23, 24:
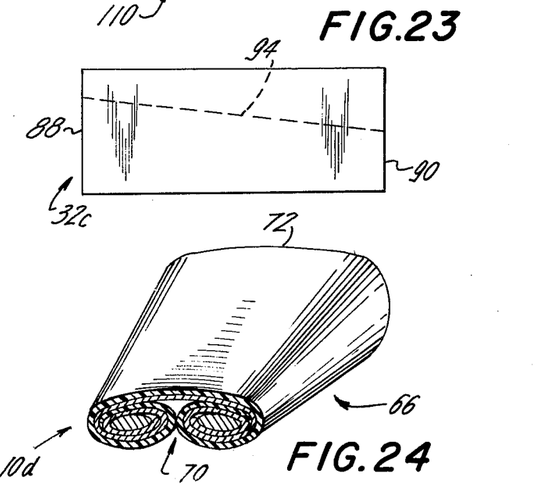
FIG. 23 is a side view of the die shown in FIG. 22.
FIG. 24 is a perspective view of a closed-end splice formed employing the die shown in FIG. 22.

In yet another embodiment of the crimping die of the invention as shown in FIG. 22 and designated generally by the numeral 32c, the crimping die 32c will comprise a body portion 86 having a first end 88 and a second end 90, generally U-shaped receptacle 92, a bottom wall 94, a pair of side walls 96 and 98 and an elongated ridge 100 which extends longitudinally from the first end 88 to the second end 90. The elongated ridge 100, bottom wall 94 and side walls 96 and 98 define a pair of concavely arcuate segments 104 and 106 which extend from the first end 88 to the second end 90, said pair of concavely arcuate segments 104 and 106 varying in depth from said first end 88 to said second end 90 as shown in FIGS. 22 and 23. Furthermore, the side walls 96 and 98 taper outwardly with respect to each other and extend increasingly further away from the elongated ridge 100, as shown.

The splice produced employing the crimping die 32c employing the technique and apparatus and described hereinbefore, will have the configuration as shown by the splice 10d illustrated in FIG. 24 and will take on the attributes of the splices 10b and 10c. The narrow end 70 of the splice 10d will be flattened and substantially close off the ends of the conductive cores 78 and 80 with the depth and the width of the splice varying and increasing from the narrow end 70 to the wide end 72.

As in the case of the dies 32a and 32b, the die 32c may or may not include arcuate segments whose imaginary circular extensions are disposed tangentially with respect to one another. In a like manner, the supply strip employed in connection therewith may or may not include insulation, corrugated or otherwise.

As noted previously, the composite supply strips wherein said non-conductive layer is corrugated or otherwise, as well as the aforedescribed methods of employing same in a machine of the type described in U.S. Pat. No. 3,636,611 and parent application Ser. No. 335,417 makes possible the formation of not only a mechanical and electrical connection between a pair of wires but also the insulation of such a splice thus formed. Thus, for example, with respect to the splice $S^1$ shown in FIG. 10, it will be appreciated that in a typical application, the wire 40 includes a bare, stripped away conductive portion 44 as well as the remaining insulated portion 46 thereof. In like fashion, the wire 42 would include the bare, stripped away portion 48 and the remaining insulated portion 50. In accordance with the instant invention, when the splice $S^1$ is formed about the wires 40 and 42 to be joined, the metallic conductive portion 18 will securely and electrically connect the bare portions 44 and 48 while at the same time the longitudinally extending edge portions 22 and 24 of the non-conductive portion 12 will extend from the insulated portion 46 of the wire 40 to the insulated portion 50 of the wire 42 thereby completely insulating the metallic portion 18 of the splice as well as the exposed portions of the bare conductors 44 and 48.

It will also be appreciated that any of the crimping dies disclosed in parent application Ser. No. 335,417 may be employed in carrying out the methods for forming splices of the present invention as long as the concavely arcuate depressions or circular segments are disposed so that if extended they would form circles which are tangential to one another. The circular segments may or may not be of the same radius depending upon the diameter of the elements to be joined. For example, where the elements, such as wires, are of different diameters, the circular segments will have different diameters corresponding to the diameters of such wires.

The various crimping dies of the invention may be employed in conjunction with a splicing machine such as illustrated in FIG. 14 of parent application Ser. No. 335,417. Such machine includes means for forming the composite supply strip from a separate supply of non-conductive material and a separate supply of conductive material. A detailed description of such machine is set out in application Ser. No. 335,417.

It will also be understood that in the corrugated composite supply strip of the invention the surface of the conductive layer disposed away from the non-conductive layer may include gripping means, such as serrations, convolutions, knurls, perforations and the like to increase electrical and physical or bonding contact area with the elements to be joined or terminated.

We claim:
1. Apparatus for connecting two elements for forming terminals comprising:
   means for feeding a composite supply strip formed from an elongated layer of non-conductive material and an elongated layer of electrically conductive material;
   means for severing a predetermined length of said supply strip from the remaining supply of said strip and
   crimping means for crimping said length about elements to be joined until said electrically conductive material is in contact with said elements, said crimping means including a die, wherein said die comprises:
   a body portion having a generally U-shaped receptacle defined by a bottom wall, and a pair of side walls, and
   an elongated ridge in said bottom wall, said ridge and bottom wall defining a pair of concavely arcuate circular segments, each of said circular segments extending from said ridge to said side walls, the imaginary circles of which said segments form a portion being disposed tangentially with respect to one another so as not to overlap one another.

2. The apparatus in accordance with claim 1 wherein said pair of circular segments are of substantially the same radius.

3. The apparatus in accordance with claim 1 wherein said die is adapted to receive a U-shaped connector member having a crown portion and a pair of legs, the depth of said receptacle of said die measured from said bottom wall to the top of said side walls being greater than the length of the legs of said U-shaped conductor member.

4. Apparatus for connecting two elements for forming terminals comprising:
   means for feeding a composite supply strip formed from an elongated layer of non-conductive material and an elongated layer of electrically conductive material;
   means for severing a predetermined length of said supply strip from the remaining supply of said strip and
   crimping means for crimping said length about elements to be joined until said electrically conductive material is in contact with said elements, said crimping means including a die, wherein said die comprises:
   a body portion having first and second ends and a generally U-shaped receptacle defined by a bottom wall and a pair of side walls, and
   an elongated ridge disposed in said bottom wall, said ridge, bottom wall and side walls defining a pair of concavely arcuate segments extending from said first end to said second end of said body portion, said pair of concavely arcuate segments varying in depth from said first end to said second end.

5. The apparatus in accordance with claim 4 wherein said side walls of said die extend parallel to said ridge.

6. The apparatus in accordance with claim 4 wherein said side walls of said die taper outwardly with respect to each other and extend increasingly further away from said ridge.

7. The apparatus in accordance with claim 4 wherein each of said pair of concavely arcuate circular segments are of substantially the same radius along the length of said die.

8. The apparatus in accordance with claim 4 wherein imaginary circular extensions of said pair of circular segments are disposed tangentially with respect to one another.

9. Apparatus for connecting two elements for forming terminals comprising:
    means for feeding a composite supply strip formed from an elongated layer of non-conductive material and an elongated layer of electrically conductive material;
    means for severing a predetermined length of said supply strip from the remaining supply of said strip and
    crimping means for crimping said length about elements to be joined until said electrically conductive material is in contact with said elements, said crimping means including a die, wherein said die comprises:
        a body portion having first and second ends and a generally U-shaped receptacle defined by a bottom wall and a pair of side walls and,
        an elongated ridge disposed in said bottom wall, said ridge, bottom wall and side walls defining a pair of concavely arcuate segments extending from said first end to said second end of said body portion, wherein said side walls taper outwardly with respect to each other and flare away from said ridge.

10. The apparatus in accordance with claim 9 wherein each of said pair of concavely arcuate circular segments is of substantially the same radius along the length of said die.

11. The apparatus in accordance with claim 9 wherein imaginary circular extensions of said pair of circular segments are disposed tangentially with respect to one another.

* * * * *